(12) United States Patent
Lota

(10) Patent No.: US 7,175,217 B1
(45) Date of Patent: Feb. 13, 2007

(54) VEHICLE POWER OUTLET BEZEL ASSEMBLY

(75) Inventor: Charan Singh Lota, Canton, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 11/347,093

(22) Filed: Feb. 3, 2006

(51) Int. Cl.
*B60R 7/04* (2006.01)

(52) U.S. Cl. .................. 296/24.34; 296/1.07

(58) Field of Classification Search ............. 296/24.34, 296/37.9, 37.8, 37.12, 37.13, 1.07, 1.08
See application file for complete search history.

(56) References Cited

U.S. PATENT DOCUMENTS

| | | | |
|---|---|---|---|
| 1,622,263 | A | 3/1927 | Schoeller |
| 3,308,417 | A | 3/1967 | Hammell et al. |
| 3,355,702 | A | 11/1967 | Mundschenk et al. |
| 4,720,131 | A * | 1/1988 | Grote ................. 296/37.9 |
| 5,886,298 | A | 3/1999 | Daoud |
| 6,025,557 | A | 2/2000 | Daoud |
| 6,133,528 | A | 10/2000 | Henriott et al. |
| 6,171,141 | B1 | 1/2001 | Yasui et al. |
| 6,332,806 | B1 | 12/2001 | Yasui et al. |
| 6,479,748 | B2 | 11/2002 | Mori |
| 6,495,755 | B2 | 12/2002 | Burton et al. |
| 6,612,875 | B1 | 9/2003 | Liao |
| 6,726,267 | B2 * | 4/2004 | Kim et al. ................. 296/24.34 |
| 6,857,676 | B2 * | 2/2005 | Kawaguchi et al. ....... 296/37.9 |
| 6,875,052 | B1 | 4/2005 | Lo et al. |
| 6,966,794 | B2 | 11/2005 | Aoyama et al. |
| 2001/0030436 | A1 * | 10/2001 | Kifer et al. ................. 296/24.1 |
| 2003/0102143 | A1 | 6/2003 | Sato et al. |
| 2003/0107228 | A1 * | 6/2003 | Ono et al. .................. 296/24.1 |
| 2004/0119308 | A1 * | 6/2004 | Kawaguchi et al. ....... 296/37.9 |
| 2004/0134503 | A1 * | 7/2004 | Windorfer et al. ......... 296/37.9 |
| 2005/0205591 | A1 * | 9/2005 | Kogami ................... 296/37.12 |
| 2006/0022478 | A1 * | 2/2006 | DeLong et al. ............. 296/37.8 |
| 2006/0113811 | A1 * | 6/2006 | Tanaka et al. ........... 296/24.34 |

* cited by examiner

*Primary Examiner*—Jason Morrow
(74) *Attorney, Agent, or Firm*—Gifford, Krass, Groh, Sprinkle, Anderson & Citkowski, P.C.

(57) ABSTRACT

A center console for an automotive vehicle having a power outlet device, a wall and a bezel. The wall has a pair of channels that are spaced apart. The bezel has spaced apart and opposite sides. The sides of the bezel extend into the respective channels in the wall to constrain the bezel in a direction generally orthogonal to the bezel. The bezel also includes a retaining member that extends outwardly from an edge thereof. The retaining member is lockingly engageable with a tab extending outwardly from the wall to constrain the bezel in a direction generally parallel with the channels.

16 Claims, 3 Drawing Sheets

VEHICLE POWER OUTLET BEZEL ASSEMBLY

BACKGROUND OF THE INVENTION

1. Field of the Invention

The invention relates to instrument panels for automotive vehicles. More particularly, the invention relates to a bezel for supporting a power outlet in the instrument panel.

2. Description of the Related Art

Vehicles typically include a 12 volt direct current socket for energizing a cigarette lighter or providing a source of power for accessories, such as air pumps and car vacuums. The socket is typically mounted to a bezel, which is fixedly secured to a dashboard or console in the interior of the vehicle using screws or hooked tabs. It remains desirable to provide an improved arrangement for coupling the bezel to the dashboard or console, which facilitates installation of the socket and provides an enhanced appearance in term of fit and finish.

SUMMARY OF THE INVENTION

According to one aspect of the invention, a center console is provided for use in an interior of an automotive vehicle. The center console includes a power outlet device, a wall and a bezel. The wall has a pair of longitudinally extending channels that are spaced apart. The bezel has spaced apart and opposite sides. The sides of the bezel extend into the respective channels in the wall to constrain the bezel in a direction generally orthogonal to the bezel. The bezel also includes a retaining member that extends outwardly from an edge thereof. The retaining member is lockingly engagable with a tab extending outwardly from the wall to constrain the bezel in a direction generally parallel with the channels.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
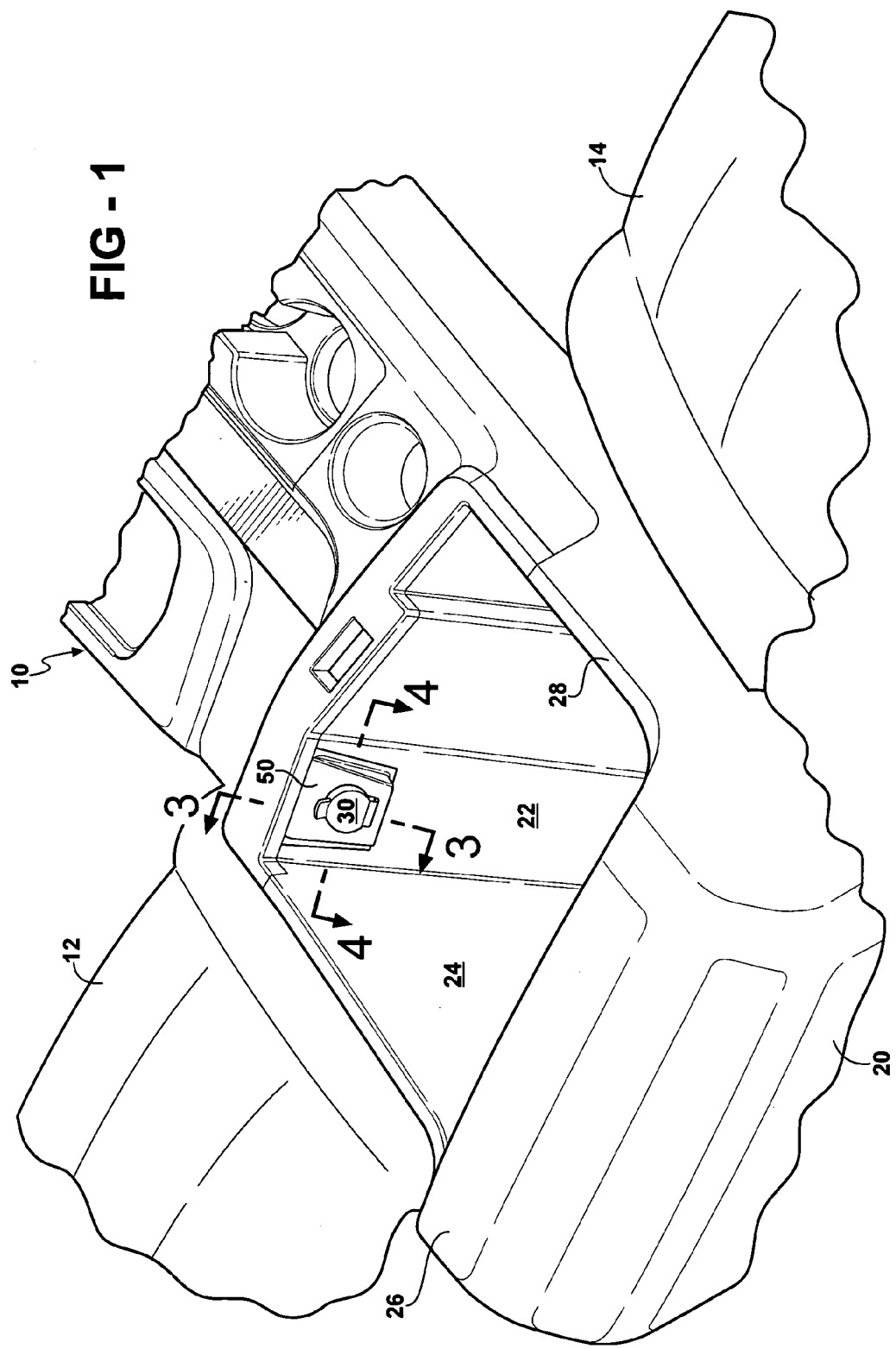
FIG. 1 is a perspective view of a vehicle center console with a power outlet according to one embodiment of the invention.

Referring to the FIG. 1, a center console for an automotive vehicle is generally indicated at 10. The center console 10 is disposed between front driver 12 and passenger 14 seats in the vehicle passenger compartment. The console 10 includes a bin 20 having a plurality of upright walls 22, 24, 26, 28. One of the walls 22 is adapted to support a power outlet 30. The power outlet 30 provides electricity to accessories, such as cigarette lighters, air pumps, and vacuums. Assembly of the outlet 30 and the console 10 is described in greater detail below.

Figure 2:
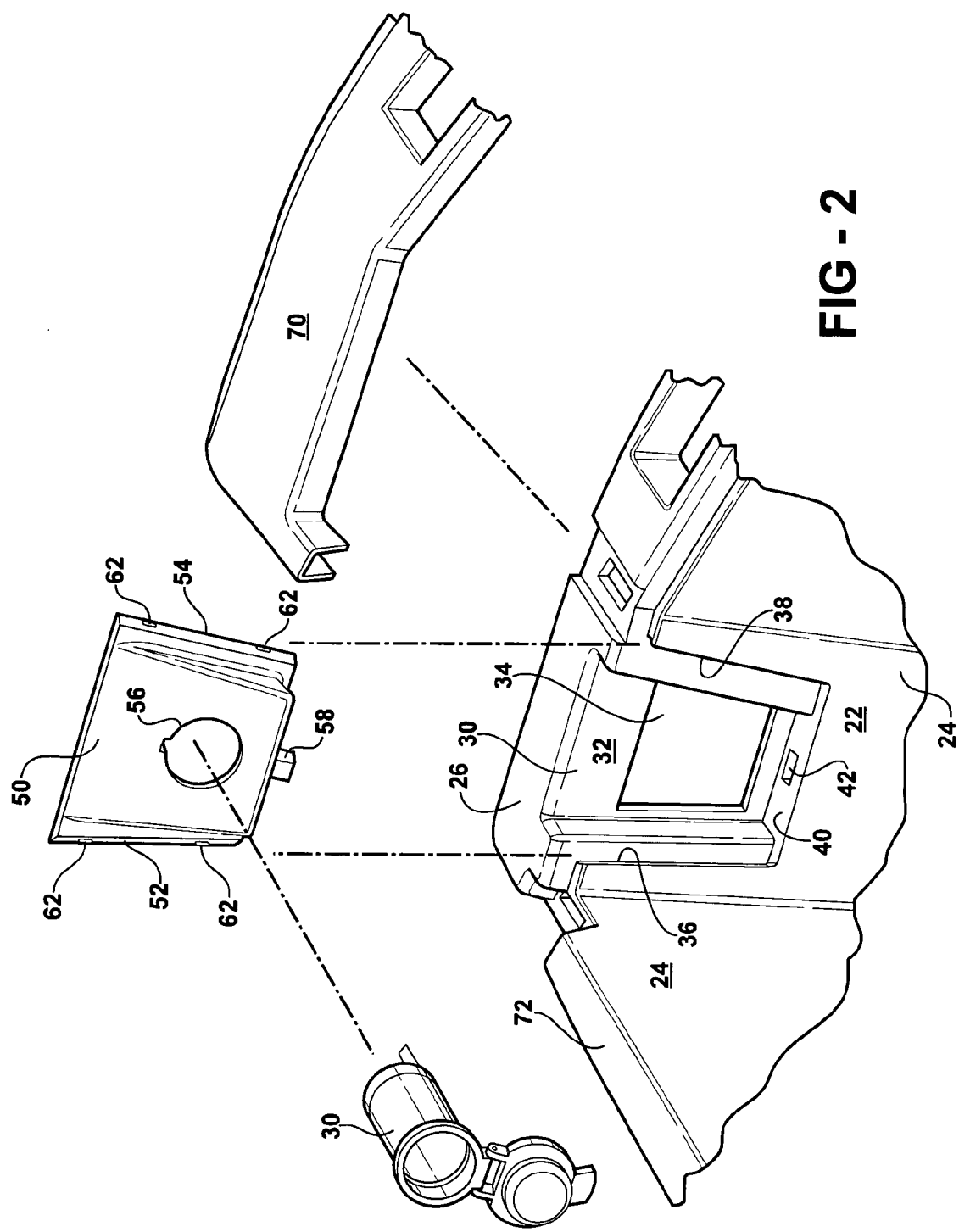
FIG. 2 is an exploded view of the center console of FIG. 1.
Figure 4:
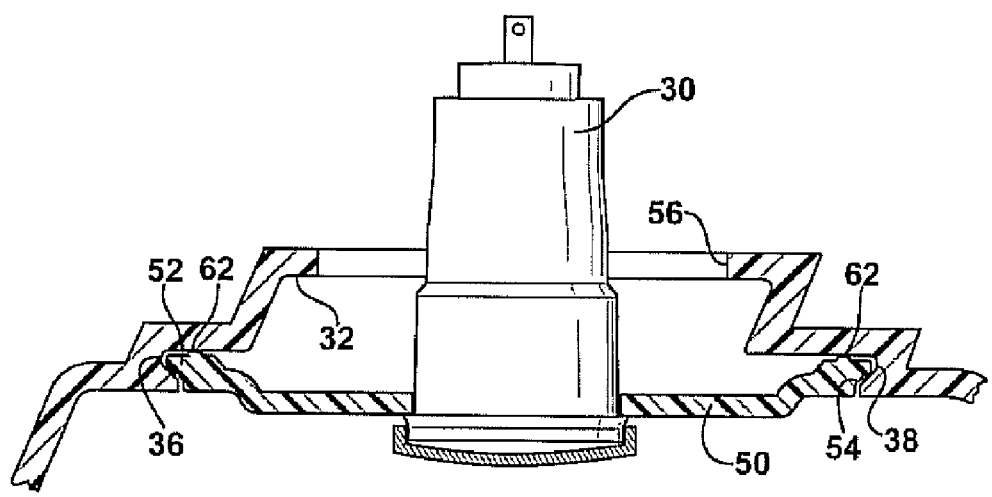
FIG. 4 is a cross sectional view of the center console of FIG. 1.

Referring to FIG. 2, the wall 22 includes a side face 24 and a top face 26. A pocket 30 is recessed relative to the side 24 and top 26 faces. The pocket 30 includes a back surface 32 generally parallel with the side face 24. An opening 34 is formed in the back surface 32 of the pocket 30. As best shown in FIG. 4, a pair of flanges or channels 36, 38 are formed on opposite sides of the pocket 30. The channels 36, 38 are concave and generally U-shaped. A bottom surface 40 extends between the lower ends of the channels 36, 38. An aperture 42 is formed in the bottom surface 40.

Figure 3:
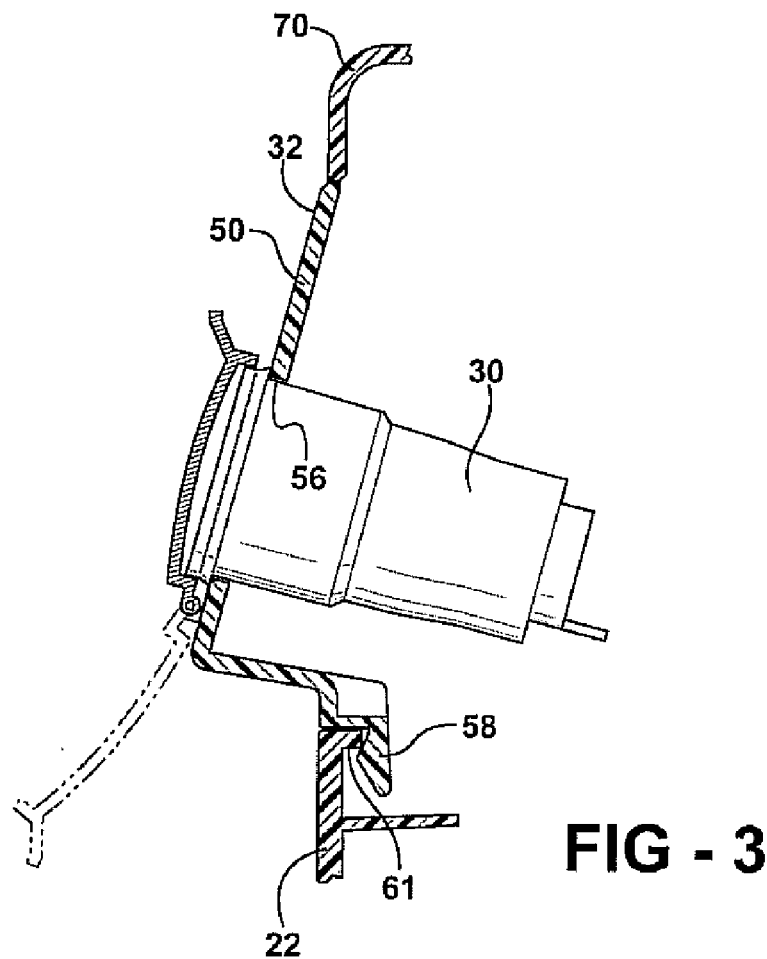
FIG. 3 is a cross sectional view of the center console of FIG. 1.

Referring to FIGS. 2–4, the console 10 also includes a bezel 50 that extends between spaced apart and opposite sides 52, 54. The sides 52, 54 are shaped to extend into the channels 36, 38. A hole 56 is formed in the bezel 50 for receiving and supporting the outlet 30 therein. A retaining member 58 in the form of a hooked tab is provided along a bottom edge 60 of the bezel 50.

In assembly, the sides 52, 54 of the bezel 50 are inserted into respective channels 36, 38 in the wall 22. Ribs or standoffs 62 are provided along the sides 52, 54 of the bezel 50 to reduce the friction associated with sliding the bezel 50 along the channels 36, 38. The bezel 50 is pushed downwardly so that the retaining member 58 extends through the aperture 42. The retaining member 58 lockingly engages a protruding tab 61 to constrain the bezel 50 in the vertical direction relative to the wall 22. A panel 70 is fixedly secured along the top face 26 of the wall 22 to conceal a top edge 72 of the bezel 50 and provide a substantially continuous visual appearance with a top surface 80 of the adjacent wall 24.

The invention has been described in an illustrative manner. It is, therefore, to be understood that the terminology used is intended to be in the nature of words of description rather than of limitation. Many modifications and variations of the invention are possible in light of the above teachings. For example, the outlet 30 as shown in the figures is a standard 12 volt direct current outlet. It should, however, be readily appreciated that the outlet 30 can be also be an alternating current outlet. Also, other areas of the console 10 or instrument panel can be adapted as described above to support the bezel 50 and outlet 30 assembly. Thus, within the scope of the appended claims, the invention may be practiced other than as specifically described.

The invention claimed is:

1. A center console for use in an interior of an automotive vehicle, said center console comprising:
   a power outlet device;
   a wall having pair of longitudinally extending channels that are spaced apart to define a plane; and
   a bezel having a hole for supporting the power outlet device therein, the bezel having spaced apart and opposite sides, the sides of the bezel being retained in respective channels in the wall to constrain the bezel in a direction generally orthogonal to the plane defined by the channels, the bezel also including a retaining member extending outwardly from an edge thereof, the retaining member being lockingly engagable with the wall to constrain the bezel in a direction generally parallel with the channels.

2. A center console as set forth in claim 1, wherein the wall includes an outwardly extending tab for lockingly engaging the retaining member.

3. A center console as set forth in claim 2, wherein the wall includes an aperture that receives the retaining member therethrough for lockingly engaging the tab.

4. A center console as set forth in claim 3, wherein the aperture is formed in a bottom surface of the wall that extends between lower ends of the channels.

5. A center console as set forth in claim 1, wherein the retaining member is a hook shaped tab extending outwardly from a bottom edge of the bezel.

6. A center console as set forth in claim 1, wherein the channels have a generally U-shaped cross section.

7. A center console as set forth in claim 1, wherein the sides of the bezel are generally parallel.

8. A center console as set forth in claim 1, wherein the wall includes a recessed pocket having a back surface spaced apart from the channels, the back surface having a hole formed therein for receiving wires therethrough for energizing the power outlet device.

9. A center console for use in an interior of an automotive vehicle, said center console comprising:
- a power outlet device;
- a wall having pair of longitudinally extending channels that are spaced apart; and
- a bezel configured to support the power outlet device, the bezel having spaced apart and opposite sides, the sides of the bezel being retained in respective channels in the wall to constrain the bezel in a direction generally orthogonal to the channels, the bezel also including a retaining member extending outwardly from an edge thereof the retaining member being lockingly engagable with the wall to constrain the bezel in a direction generally parallel with the channels, the bezel having a rib extending outwardly from the sides of the bezel for reducing friction associated with sliding movement of the bezel along the channels.

10. A center console as set forth in claim 9, wherein the wall includes an outwardly extending tab for lockingly engaging the retaining member.

11. A center console as set forth in claim 10, wherein the wall includes an aperture that receives the retaining member therethrough for lockingly engaging the tab.

12. A center console as set forth in claim 11, wherein the aperture is formed in a bottom surface of the wall that extends between lower ends of the channels.

13. A center console as set forth in claim 9, wherein the retaining member is a hook shaped tab extending outwardly from a bottom edge of the bezel.

14. A center console as set forth in claim 9, wherein the channels have a generally U-shaped cross section.

15. A center console as set forth in claim 9, wherein the sides of the bezel are generally parallel.

16. A center console as set forth in claim 9, wherein the wall includes a recessed pocket having a back surface spaced apart from the channels, the back surface having a hole formed therein for receiving wires therethrough for energizing the power outlet device.

* * * * *